April 11, 1961 B. C. FLEMING-WILLIAMS 2,979,713
RADAR INDICATING ARRANGEMENTS
Filed Aug. 9, 1954 4 Sheets-Sheet 1
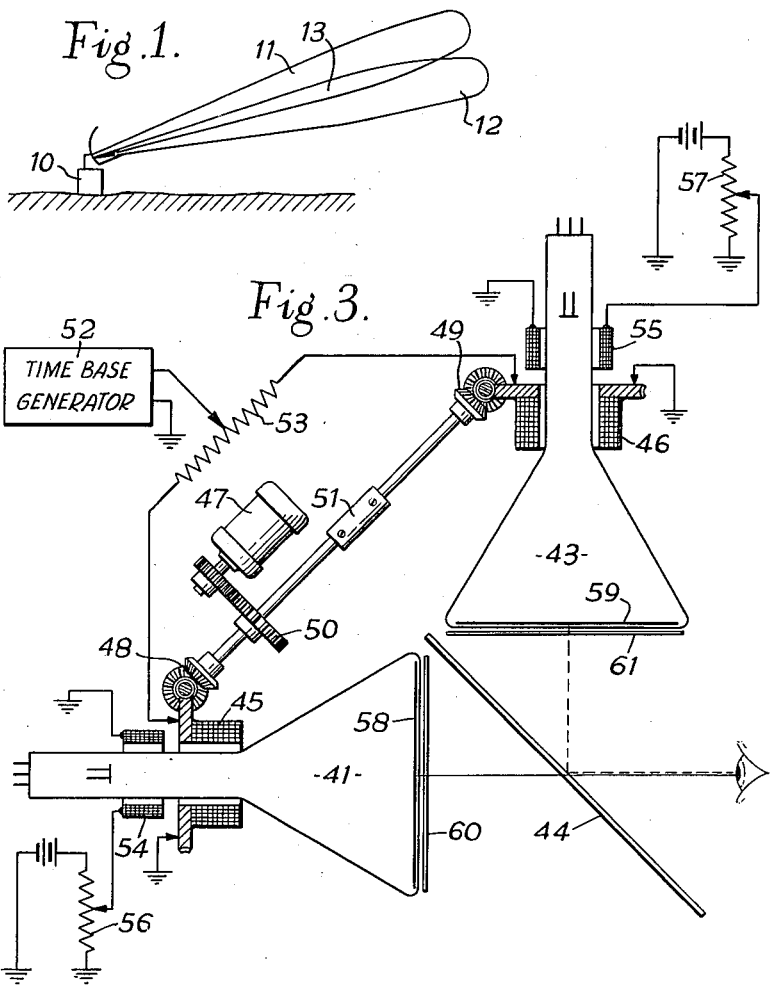
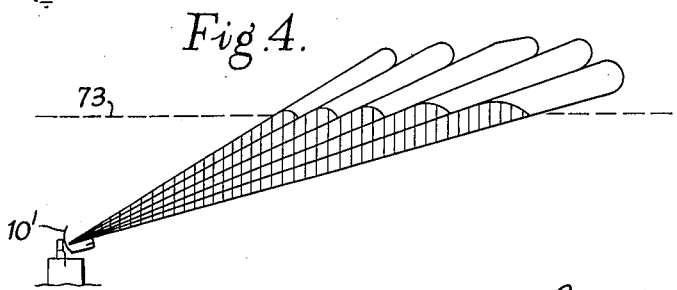
INVENTOR
Brian C. Fleming-Williams
BY
Ralph B. Stewart
ATTORNEY

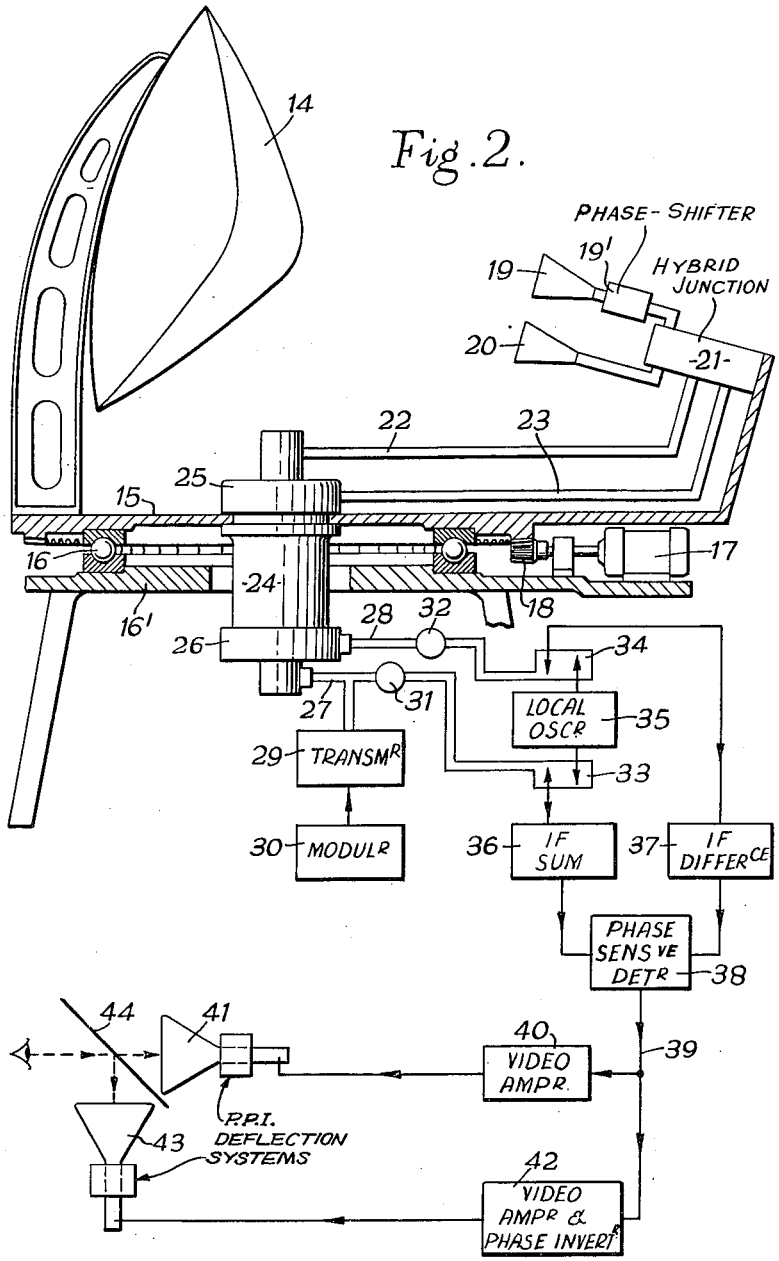

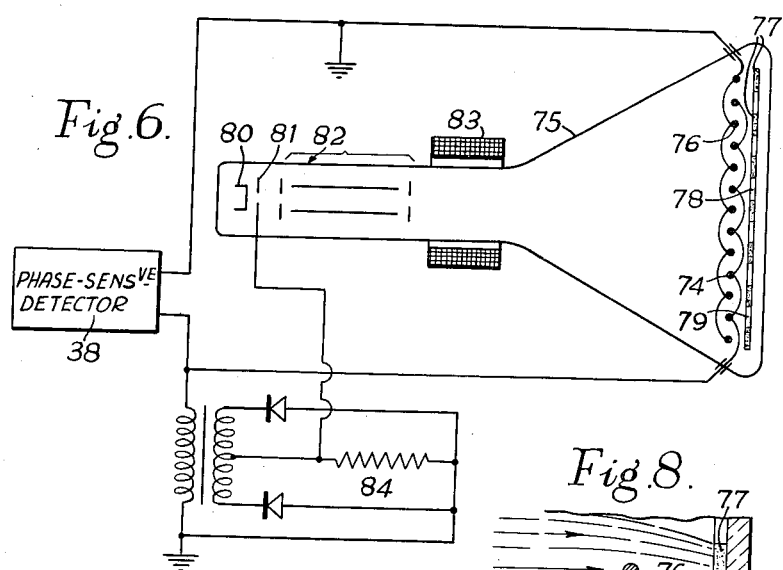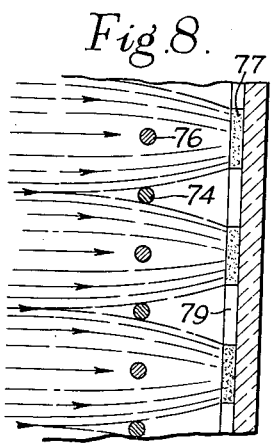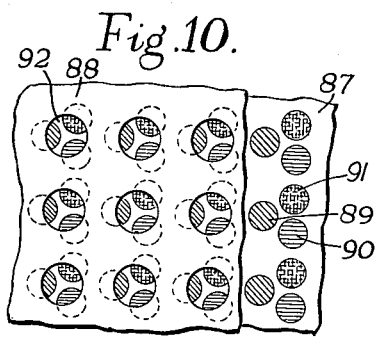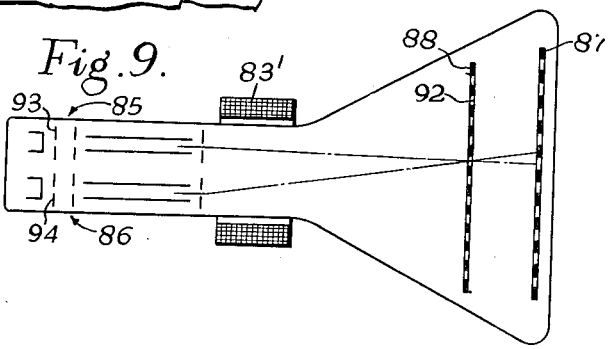

United States Patent Office 2,979,713
Patented Apr. 11, 1961

2,979,713

RADAR INDICATING ARRANGEMENTS

Brian Clifford Fleming-Williams, London, England, assignor to A. C. Cossor Limited, London, England Filed Aug. 9, 1954, Ser. No. 448,667

Claims priority, application Great Britain Aug. 21, 1953

7 Claims. (Cl. 343—7.9)

The present invention relates to radar indicating arrangements.

A plan position indicator such as is described, for example, in the specification of Patent No. 2,663,014, has been used to provide indications of the dispositions of objects lying substantially in a plane. If it is desired to obtain indications in a radar equipment of objects which do not lie substantially in one plane, as in the case, for example, of indications of aircraft at differing heights, further means in addition to the usual plan position indicator are required. A cathode ray tube display which provides distance and elevation information has been employed in addition to a plan position indicator to give information regarding height of aircraft.

It is an object of the present invention to provide improved means whereby an indication of the heights or angles of elevation of bodies can be given in radar equipment.

According to the present invention there is provided radar equipment comprising means for receiving separately radar echoes from bodies at different heights or angles of elevation, a cathode ray tube arranged in a plan position indicator of said echoes, and means whereby the echoes from different heights or angles of elevation are presented on said indicator in different colours.

Figure 5:
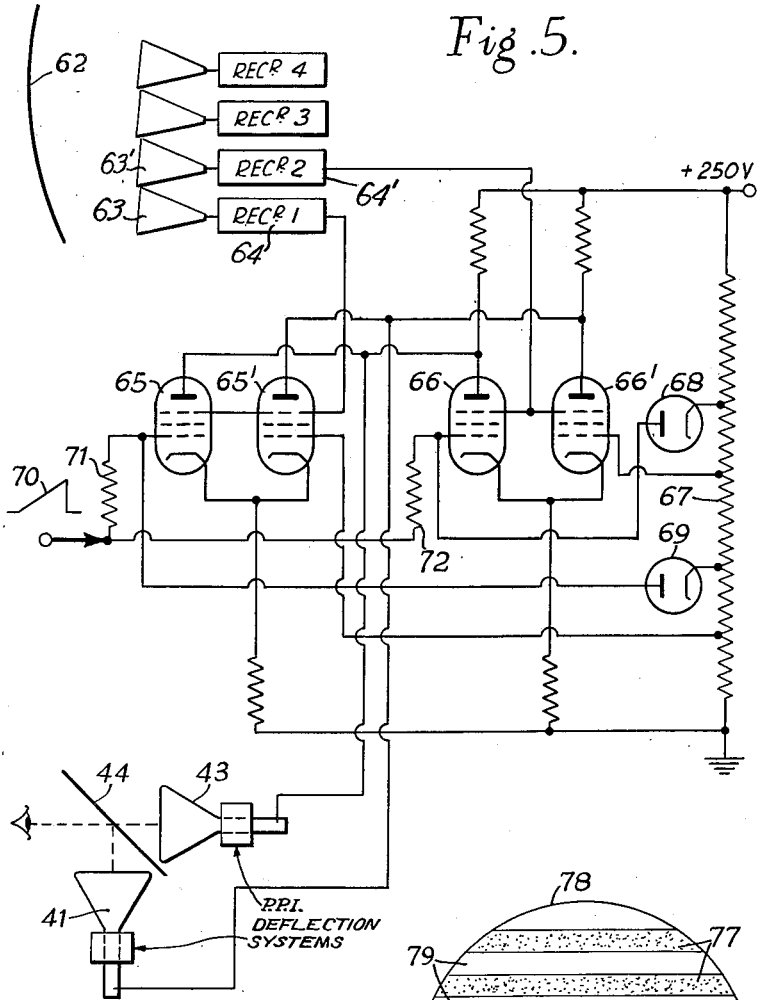
Figure 7:
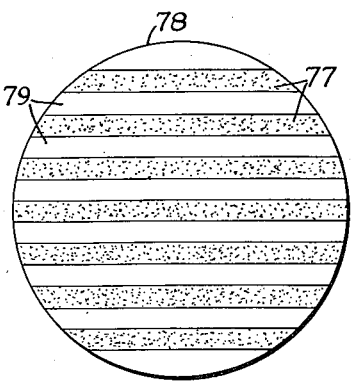

The invention will be described, by way of example, with reference to the accompanying drawings in which Fig. 1 is an explanatory diagram, Fig. 2 is a diagrammatic representation of one embodiment of the invention, Fig. 3 shows one way in which the cathode ray tubes of Fig. 2 may be operated, Fig. 4 is a further explanatory diagram, Fig. 5 is a circuit diagram of part of another embodiment of the invention, Fig. 6 shows a modification of the presentation part of Fig. 2, Fig. 7 is an end view of the screen of the cathode ray tube in Fig. 6, Fig. 8 is an enlarged view of a part of Fig. 6, for explaining the mode of operation, Fig. 9 shows a further modification of the presentation part of Fig. 2, and Fig. 10 is an enlarged end view of parts of the screens in Fig. 9.

Referring to Fig. 1, radar equipment 10 is arranged to radiate radar signals in two lobes 11 and 12 which overlap in the region 13, and to have separate receivers for signals in the two lobes. According to the angle of elevation of a body from which an echo is received, the echo will be received by one receiver or the other, or when the body is in the region 13, by both receivers.

Referring to Fig. 2, the radar equipment shown comprises a paraboloid reflector 14 mounted upon a turn-table 15 rotatable on bearings 16 upon a base 16'. The turn-table is rotated by a motor 17 through gearing 18. Also mounted on the turn-table 15 is a structure comprising two horn feeds 19 and 20, a hybrid junction 21 and two waveguides 22 and 23 coupling the hybrid junction to a double rotating joint 24, which may be of known type. A phase shifter 19' is included in order to correct for the difference in path length associated with the two horn feeds 19 and 20. The upper part 25 of the joint 24 rotates with the turn-table and the lower part 26 is fixed and has wave-guides 27 and 28 coupled thereto. The joint 24 couples the rotating wave-guide 22 to the fixed wave-guide 27 and the rotating wave-guide 23 to the fixed wave-guide 28.

A radar transmitter 29 modulated by a modulator 30 is coupled by the wave-guides 27 and 22 to the hybrid junction 21. Conventional T and R cells 31 and 32 are provided to prevent energy from the transmitter 29 passing to the receiving equipment.

The hybrid junction 21 is of known type and is such that the sum of the signals received by the horn feeds 19 and 20 is applied through wave-guides 22 and 27 to a mixer chamber 33 and the difference between the signals received by the two horn feeds is applied through the wave-guides 23 and 28 to a mixer chamber 34. By symmetry, energy from the transmitter will emerge equally from both horn feeds. Local oscillations are applied to the mixer chambers 33 and 34 from an oscillator 35. Intermediate frequency sum and difference oscillations are fed through amplifiers 36 and 37 respectively to a phase-sensitive detector 38 which generates at its output 39 voltages of sign dependent upon the relative phase of the input oscillations. The voltage generated at 39 due to a signal received more strongly by horn 19 than horn 20 will be of opposite phase to the voltage generated if the signal was more strongly received by horn 20. Hence the output of the phase sensitive detector 38 will be of opposite polarity in these two cases.

A video amplifier 40 is responsive only to voltages of one sign and these are applied to the control grid of a cathode ray tube 41. A video amplifier 42 is responsive to voltages of opposite sign to those accepted by the amplifier 40 and also inverts the sign of these voltages which are applied to the control grid of a second cathode ray tube 43. The screens of the two tubes 41 and 43 fluoresce in different colours, say red and green, when bombarded and are viewed in superposition through a half-silvered mirror 44.

In operation, echoes from the upper lobe 11 in Fig. 1 are picked up by the horn feed 20 and those from the lower lobe 12 are picked up by the horn feed 19. The tubes 41 and 43 are arranged to give P.P.I. display and the tube 41 (say) is arranged to respond to the signals from the upper lobe and to produce red light while the tube 43 responds to signals from the lower lobe and produces green light. Signals from the region 13 in Fig. 1 produce equal responses from the two tubes and thus appear nearly white to the viewer.

If preferred the two horn feeds 19 and 20 may be coupled individually to the cathode ray tubes 41 and 43.

Fig. 3 shows in more detail how the tubes 41 and 43 of Fig. 2 may be arranged. The tubes are provided with conventional scanning coils 45 and 46 rotated by means of a motor 47 and gearing 48, 49 and 50 in synchronism with one another and with the rotation of the aerial 14, 19, 20 of Fig. 2, to produce a plan-position type of indication in known manner. Coils 45 and 46 energized by saw-tooth pulses from time base generator 52 deflect the beams of tubes 41 and 46 radially outward from the centers of the screens, and rotation of coils 45 and 46 by motor 47 deflects the lines of radial deflection of the beams angularly about the centers of the screens. An adjustable coupling 51 is provided whereby the scannings of the two tubes can be adjusted angularly. Time base oscillations are fed to the scanning coils from a generator 52 through a balancing potentiometer 53. This enables the velocities of scanning in the two tubes to be made equal. The tubes are also provided with coils 54 and 55 through which direct currents can be passed, these currents being independently adjustable by means of potentiometers 56 and 57. By adjusting 51, 53, 56 and 57, the scannings on the two tubes can be brought into exact coincidence when viewed through the half-silvered mirror 44.

The screens 58 and 59 of the tubes are arranged to fluoresce in different colours and filters 60 and 61 transmitting the same colour as that of the fluorescence in the tubes with which they co-operate are also provided. Screens with white fluorescence may of course be used with the filters or when the screens fluoresce in different colours the filters can be dispensed with.

As shown in Fig. 4 the radar equipment 10' may radiate more than two lobes. The signals reflected within each lobe may be fed to a different receiver and cathode ray tube, all having screens of different colour. Alternatively an arrangement using more than two lobes can advantageously be used to represent different heights (as distinct from different angles of elevation) in different colours, for example as shown in Fig. 5.

In Fig. 5 a reflector 62 has associated therewith a number of horn feeds 63, 63' etc. each coupled to a separate radar receiver 64, 64' etc. The outputs of the receivers are switched, as will be described, to the control grids of the cathode ray tubes 41 and 43, one of which is red and the other green (say). The switching means comprise "long-tailed pairs" of valves 65 and 65', 66 and 66', the numbers of pairs being equal to the number of radar receivers 64, 64' etc. The valves are connected as shown between the outputs of the receivers 64, 64' etc., and the control grids of the cathode ray tubes 41 and 43. The valves 65' and 66' have their control grids held at different fixed potentials by connections to tappings on a potential divider 67. The control grids of valves 65 and 66 are connected to further tappings on the potential divider through diodes 68 and 69 respectively. A sawtooth oscillation 70 from the associated time base generator (as shown at 52 in Fig. 3) is applied to the control grids of the valves 65 and 66 through resistors 71 and 72. The deflection system for display tubes 41 and 43 is not shown in detail in Fig. 5 but is the same as in Fig. 3.

The circuit operates as follows:

Assuming that initially the time base voltage 70 is at earth potential, the valves 65' and 66' are conducting and signals from both receivers 64 and 64' are fed to the tube 41. As the time base voltage rises the valve 65 will become conducting and the valve 65' insulating. The signals from the receiver 64 will then pass to the tube 43 while those from 64' will still pass to the tube 41. With further increase in time base voltage the valve 66 will conduct and the valve 66' will insulate thus connecting the receiver 64' also to the tube 43. The times at which these switching operations take place are defined by the positions of the tappings on the potential divider 67 in relation to the scale of the time base and may be made such that the time from the emission of a radar pulse to the switching of a receiver from 41 to 43 is substantially proportional to the cosecant of the angle of the lobe on which that receiver operates. In this way echoes from bodies located above the line 73 in Fig. 4 may be arranged to be represented in one colour by the tube 43 and echoes from bodies below the line 73 will be represented in another colour by the tube 41.

It will be understood that further pairs of valves are provided for receivers additional to 64 and 64', these being connected in the same way as the pairs shown but to suitably different tappings on the potential divider 67. If a distinction is required between three height levels instead of two, each pair of valves is replaced by three valves, the anodes being connected respectively to the control grids of three cathode ray tubes each responding in a different colour.

It is not necessary to use separate cathode ray tubes and use may be made of arrangements employed for colour television in order to produce the required result. Thus as shown in Fig. 6, the phase-sensitive detector 38 of Fig. 2 may be connected to one set of wires 74 of a grid of parallel wires in a cathode ray tube 75, the other set of wires 76 being earthed. The spacing and thickness of the wires is in practice much less than that shown. The wires of the set 76 are arranged directly in front of shaded strips 77 on a screen 78 shown in end view in Fig. 7. These strips may be of red-fluorescing material. The interleaved strips 79 are, say, of green-fluorescing material and the wires 74 are opposite to these strips.

Referring to Fig. 8, the wires 76 are assumed to be positive relatively to the wires 74 and it is seen that the electrons, as indicated by the broken lines, are deflected towards and concentrated upon the strips 77 and away from the strips 79. A reversal of the relative polarity of the wires will cause the electrons to be concentrated upon the strips 79.

Referring again to Fig. 6, the cathode ray tube 75 has a cathode 80, control grid 81, focusing electrodes 82 and a scanning coil 83 which may be rotated and energised as described with reference to Fig. 3 so that a P.P.I. presentation is provided. The signals fed from the phase-sensitive detector 38 are, as previously explained, positive or negative in polarity according to whether signals are received by one receiver or the other (that is for example by horn feed 19 or 20 in Fig. 2). Accordingly for signals received from one lobe the electrons are concentrated on the strips 77 and the light emitted is, say, red and for signals received from the other lobe they are concentrated on the other strips 79 and the light emitted is, say, green. The signals from the phase-sensitive detector 38 are also applied to a circuit 84 by which the control grid 81 is driven positive whenever a signal in either sense appears at the output of the phase-sensitive detector.

As is known in television the tube of Fig. 6 may be operated in three colours, the strips being then in three interlaced sets. The selection of the strips bombarded is effected in accordance with the magnitude and sense of the voltages applied to the two sets of wires.

Another form which a single cathode ray tube may take is shown in Fig. 9. Here three cathode ray beams are generated by three electron guns of which only two references 85 and 86 are shown. A single scanning coil 83', which is rotated as before, serves to control the scanning of all three beams to give a P.P.I. presentation. Two screens 87 and 88 are provided, the screen 87 (which may be the end wall of the tube or a separate screen) being provided with a coating of phosphor in a pattern of dots, the dots being in groups of three, such as 89, 90 and 91 in Fig. 10, each of a phosphor of a different colour, say red, green and blue. The screen 88 has apertures 92 opposite the centres of each group of dots. The arrangement is such that the beam from one electron gun traversing an aperture 92 falls on dot 91, that from another gun falls on the dot 89 and that from the third gun falls on the other dot 90.

Signals from three radar receivers such as those shown in Fig. 5 are applied to modulate the three control grids, such as 93 and 94 in Fig. 9, respectively. In the absence of a radar signal in any receiver the beam associated with that receiver is arranged to be cut off.

An arrangement as shown in Figs. 9 and 10 but using only two electron guns and pairs of dots of two different colours may be used when only a two-colour display, corresponding to two height layers, is required.

In the appended claims the term "viewing screen" is to be interpreted broadly to apply to the half-silvered mirror 44 as well as to screens 78 and 87.

I claim:

1. Radar equipment comprising at least two radar echo receiving means having directive radiation patterns set at different angles in a vertical plane and receiving respectively first and second sets of echoes at different angles of elevation, driving means effecting angular movement of said receiving means about a vertical axis, indicating means including a viewing screen to be viewed from a viewing point, said indicating means comprising means generating a light spot visible from said viewing point within a given area of said screen, color selecting means for causing said spot to assume selectively one of at least two different colors, deflecting means including a time-base generator for periodically deflecting said spot along a radius from a common point within said area, means for moving the radial deflection of said spot angularly about said common point in timed relation with the angular movement of said receiving means, means for modulating the brightness of said spot, means coupling said echo receiving means to said modulating means to vary the brightness of said spot in response to signals produced by received echoes and including means responsive to said sets of echoes and controlling said color selecting means for selecting the colour of said spot in dependence upon the elevation from which the echoes are received.

2. Radar equipment according to claim 1 using two of said receiving means in which said means coupled between said receiving means in which said means coupled between said receiving means and said color selecting means comprises adding means generating an output dependent upon the sum of the outputs from said two receiving means, subtracting means coupled to said receiving means and generating an output dependent on the difference between the outputs from said two receiving means, a phase-sensitive detector, means coupling the outputs of said adding and subtracting means to said phase-sensitive detector to generate at the output thereof an output whose sign is dependent upon the one of said receiving means by which the larger signals are received, and means coupling the output of said phase-sensitive detector to said color selecting means.

3. Radar equipment comprising a plurality of directive receiving means receiving signals respectively in a plurality of lobes angularly displaced relatively to one another in a vertical plane, driving means effecting angular movement of said receiving means about a vertical axis, indicating means including a viewing screen to be viewed from a viewing point, said indicating means comprising means generating a light spot visible from said viewing point within a given area of said screen, deflecting means including a time-base generator for periodically deflecting said spot along a radius from a common point within said area, means for moving the radial deflection of said spot angularly about said common point in timed relation with the angular movement of said receiving means, means for modulating the brightness of said spot, means including switching means for coupling the output from each of said receiving means selectively to said first and second modulating means, and means actuating said switching means in succession.

4. Radar equipment according to claim 3 wherein said switch actuating means comprises said time base generator and including means to effect actuation of each switching means at a time after transmission of a signal by said transmitting means substantially proportional to the cosecant of the angle of the lobe on which the receiving means associated with such switching means operates.

5. Radar equipment comprising two radar echo receiving means having directive radiation patterns set at different angles in a vertical plane and receiving respectively first and second sets of echoes at different angles of elevation, driving means effecting angular movement of said receiving means about a vertical axis, indicating means including a viewing screen to be viewed from a viewing point, said indicating means comprising two light spot generating means generating light spots of two different colors respectively to be viewed from said viewing point within a given area of said screen, deflecting means including a time-base generator for periodically deflecting said spot along a radius from a common point within said area, means for moving the radial deflection of said spot angularly about said common point in timed relation with the angular movement of said receiving means, means for modulating the brightness of said spot, and means coupling said receiving means respectively to said first and second modulating means to vary the brightness of each said spot in response to signals produced by echoes received by a different one of said receiving means.

6. Radar equipment comprising at least two radar echo receiving means having directive radiation patterns set at different angles in a vertical plane and receiving respectively first and second sets of echoes at different angles of elevation, driving means effecting angular movement of said receiving means about a vertical axis, a cathode ray tube system for producing a luminous spot visible within a given area of a viewing screen and having different color display means for displaying the luminous spot in a selectable one of at least two colors, deflecting means including a time-base generator for periodically deflecting said spot along a radius from a common point within said area, means for moving the radial deflection of said spot angularly about said common point in timed relation with the angular movement of said receiving means, means for modulating the brightness of said spot, means coupling said echo receiving means to said modulating means to vary the brightness of said spot in response to received echoes, and including means for selecting the color of the display means for the luminous spot.

7. Radar equipment in accordance with claim 6 in which the means for selecting the color of the display means is controlled by a signal from a respective one of said receiving means produced by a received echo, to select a corresponding color.

References Cited in the file of this patent

UNITED STATES PATENTS

| | | |
|---|---|---|
| 2,456,666 | Agate et al. | Dec. 21, 1948 |
| 2,508,358 | Ayres | May 23, 1950 |
| 2,514,828 | Ayres | July 11, 1950 |
| 2,540,121 | Jenks | Feb. 6, 1951 |
| 2,543,753 | Ayres | Mar. 6, 1951 |
| 2,656,532 | Crump | Oct. 20, 1953 |
| 2,687,520 | Fox et al. | Aug. 24, 1954 |
| 2,718,000 | Sunstein | Sept. 13, 1955 |
| 2,758,298 | Sunstein | Aug. 7, 1956 |

FOREIGN PATENTS

| | | |
|---|---|---|
| 638,274 | Great Britain | June 7, 1950 |